Sept. 9, 1969 P. G. BARTLETT ET AL 3,466,468

MONOSTABLE CONTROLLED SATURABLE CORE BLOCKING OSCILLATOR CIRCUIT

Filed Dec. 19, 1967 2 Sheets-Sheet 1

INVENTORS.
PETER G. BARTLETT &
JOSEPH E. MESCHI
BY
Meyer, Tilberry & Body
ATTORNEYS INVENTORS.
PETER G. BARTLETT &
JOSEPH E. MESCHI.
BY
Meyer, Tilberry & Body
ATTORNEYS United States Patent Office 3,466,468 Patented Sept. 9, 1969

3,466,468

MONOSTABLE CONTROLLED SATURABLE CORE BLOCKING OSCILLATOR CIRCUIT

Peter G. Bartlett, Davenport, Iowa, and Joseph E. Meschi, Lyons, Ill., assignors to E. W. Bliss Company, Canton, Ohio, a corporation of Delaware Filed Dec. 19, 1967, Ser. No. 691,897
Int. Cl. H03k 3/30
U.S. Cl. 307—275 17 Claims

ABSTRACT OF THE DISCLOSURE

There is provided a blocking oscillator circuit having a saturable core transformer energized by monostable oscillator outputs. A single input pulse triggers a monostable oscillator to start the circuit operation, and through control transistors, the core is saturated first in one direction for a predetermined time and then in the opposite direction for a like time by a direct current source attached to a primary winding center tap of the transformer, and a bipolar wave form with a positive and a negative amplitude with respect to a reference level is generated in the secondary winding of the transformer as a result of the single input pulse.

DISCLOSURE

This invention pertains to the art of oscillator circuits and more particularly to triggered monostable controlled saturable core blocking oscillator circuits.

The present invention is particularly adapted for controlling a saturable core reactor for providing a bipolar switching signal for driving common lines of a memory array and it will be discussed with particular reference thereto; however the invention has somewhat broader applications, and it may be used for various applications in which a bipolar switching signal is desired.

Prior art saturable reactor circuits have been used in various applications for detecting as well as producing desired signals. Illustrative of a reactor circuit for detecting and amplifying a signal is United States Patent 3,210,689. Illustrative of free running reactor circuits used as drive circuits and timer circuits are United States Patents 3,172,058 and 3,332,033. Illustrative of electronic triggered reactor circuits used as power regulating and converter circuits are United States Patents 3,067,378 and 3,078,380. Such triggered reactor circuits, as well as mechanically triggered switching circuits, have previously been confined to circuits wherein the output wave form produced from the reactor was directly related to the input wave form impressed upon the circuit.

What is not shown by the prior art is a triggered blocking oscillator circuit, utilizing a saturable reactor, for producing a bipolar output wave form as a result of a single triggering input pulse.

The present invention contemplates the overcoming of this problem by means of a triggered monostable oscillator control circuit which causes saturation of the reactor in one direction for a predetermined time and then saturation in the other direction for a like time, to produce the bipolar output upon a single initiation of the control circuit.

In accordance with the present invention there is provided a monostable controlled electronic oscillating circuit that includes a saturable reactor with a plurality of windings, a monostable oscillator control circuit having an input and an output for supplying control pulses in response to an input, and a blocking circuit with switchable paths connecting the control circuit to the saturable reactor for supplying voltages of a predetermined polarity to an output load in response to core magnetization changes of opposite senses produced by curent flow from a direct current voltage source through the windings.

The primary object of the present invention is the provision of blocking oscillator circuit incorporating a saturable reactor.

Another object of the present invention is the provision of a triggered blocking oscillator circuit incorporating a saturable reactor.

Another object of the present invention is the provision of a triggered blocking oscillator circuit incorporating a monostable control circuit and a saturable reactor.

Another object of the present invention is the provision of a trigered blocking oscillator circuit incorporating a saturable reactor to produce a bipolar switching signal in response to a single triggering pulse.

Further objects of this invention will be apparent from the following description of specific examples embodying the invention and the attached claims when taken in conjunction with the attached drawings in which:

Figure 1:
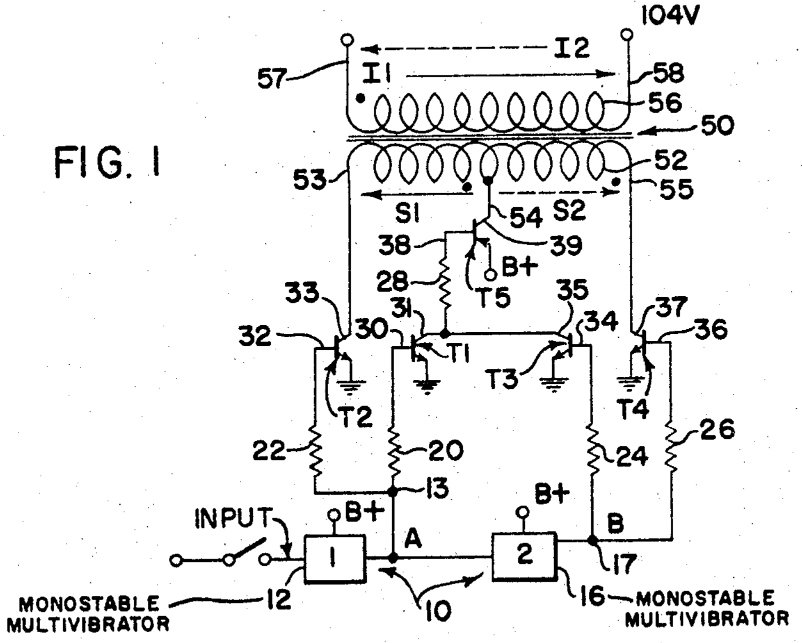
FIGURE 1 is a schematic diagram of one embodiment of the oscillator circuit.
Figure 3:
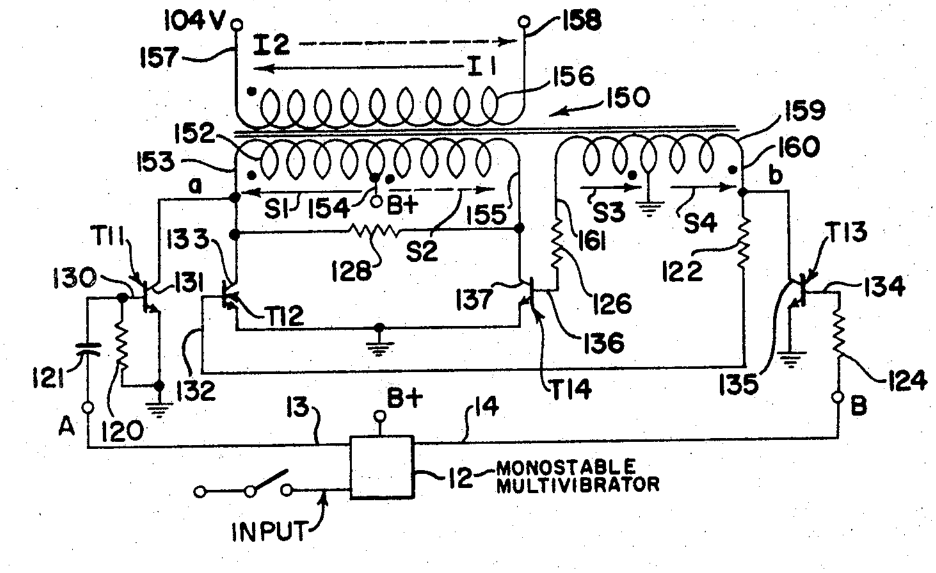
FIGURE 3 is a schematic diagram of an alternate embodiment of the oscillator circuit.

Referring now to the drawings which are for the purpose of illustrating preferred embodiments of the invention and not for the purpose of limiting the same, FIGURES 1 and 3 illustrate, in schematic form, monostable controlled blocking oscillator circuits incorporating a saturable reactor for producing a bipolar output signal on a 104 volt reference line, which is adaptable for operating as a common line for write drivers of a ceramic memory.

FIGURE 1 illustrates the first preferred embodiment of the present invention. The monostable control circuit 10 is comprised of monostable control 12 having an output 13 and monostable control 16 having an output 17. Resistors 20, 22, 24, 26 and 28 serve as input resistors with one end wired to bases 30, 32, 34, 36 and 38 of NPN transistors T1, T4, T3 and T4 and PNP transistor T5, respectively. The saturable reactor 50 is comprised of primary winding 52 having winding ends 53 and 55 and center tap 54, and secondary winding 56 having winding ends 57 and 58.

In the embodiment illustrated in FIGURE 1, the B+ voltage source is wired to controls 12 and 16 and to the emitter of transistor T5. The collector 39 of transistor T5 is wired to center tap 54 of primary winding 52. An input is wired to control 12. Output 13 of control 12 is wired to the other end of base resistors 20 and 22 and as an input of control 16, and output 17 of control 16 is wired to the other end of base resistors 24 and 26. The emitters of transistors T1, T2, T3 and T4 are all connected to ground. The collectors 33 and 37 of transistors T2 and T4 are connected to primary winding ends 53 and 55, respectively. Collectors 31 and 35 of transistors T1 and T3 are commoned and connected to the other end of base resistor 28. Secondary winding ends 57 and 58 are adapted to be connected to a memory array drive circuit, with winding end 58 connected to a 104 volt reference, for the operation contemplated. It is to be noted that ground could be used as the reference.

Figure 5:
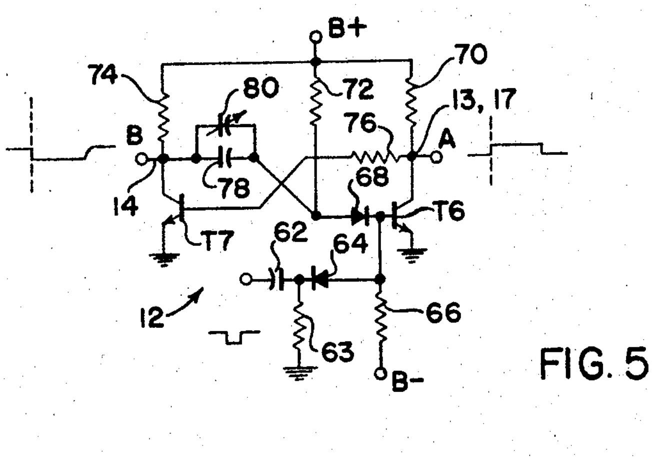

FIGURE 5 is illustrative of the monostable control 12. Capacitor 62 couples the negative input pulse through diode 64 to the base of NPN transistor T6. Resistors 72 and 66 serve as a base biasing divider network between B+ and B— for transistor T6 with diode 68 serving as a blocking diode for the base. The B+ source is connected through resistors 70, 72 and 74 to the collector of T6, to the anode of base diode 68 and to the collector of NPN transistor 77. The emitters of transistors T6 and T7 are connected to ground. Resistor 76 is cross-connected from the collector of transistor T6 to the base of transistor T7, and paralleled capacitors 78 and 80 are cross-connected from the collector of transistor T7 to the anode of base blocking diode 68. Capacitor 80 is made variable to adjust the cycle time $t$ of the monostable control. The outputs are 13 and 14, and their representative pulses A and B are illustrated for a single negative input signal.

Operation

Figure 2:
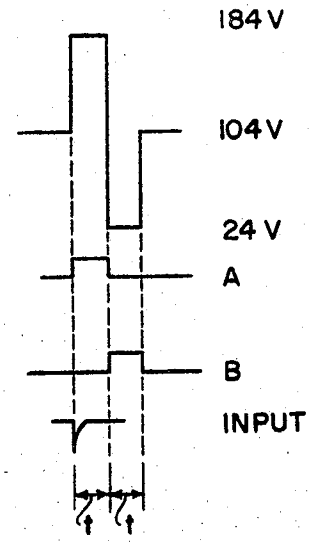
FIGURE 2 is a graph of the wave forms illustrative of the embodiment of FIGURE 1.

The operation of the embodiment illustrated in FIGURE 1 is commenced with a negative input pulse (as shown in FIGURE 2) triggering the monostable control 12 for a time $t$ to produce an output at 13 (as illustrated by FIGURE 5). The positive output at 13, through resistors 20 and 22, forward biases bases 30 and 32 of NPN transistors T1 and T2, respectively, and causes conduction in these transistors. When transistor T1 conducts, current at collector 31 causes a drop through base resistor 28 and PNP transistor T5 is forward biased into conduction. Once transistor T5 is forward biased, the B+ source is impressed upon center tap 54 of primary winding 52. Current is passed from the B+ source through transistor T5, primary winding 52 from center tap 54 to winding end 53, and transistor T2 back to ground. This current, depicted by S1, saturates reactor 50 so as to induce a current, depicted by I1, in secondary winding 56 so as to be additive to the reference voltage. The polarity dots assigned to the windings are indicative of the polarity of the induced voltage. The induced voltage illustrated is of the magnitude of 80 volts because of the turns ratio existing between the primary and secondary windings, and when added to the reference voltage of 104 volts, creates a positive 184 volts for the predetermined time $t$, which is adapted to be impressed upon the contemplated memory circuits.

When control 12 times out after time $t$, control 12 returns to its quiescent state and the output at 13 goes negative, removing the forward bias for transistors T1 and T2 to stop conduction therein, and triggers control 16 (which is identical in operation to control 12) to generate a positive output at 17. The positive output at 17, through resistors 24 and 26, forward biases bases 34 and 36 to drive NPN transistors T3 and T4 into conduction. Base 38 of PNP transistor T5 is now forward biased through resistor 28 by current flowing in transistor T3. This causes conduction from the B+ source through transistor T5 to center tap 54 and thence to ground through primary winding 52 end 55 and transistor T4. This conduction, symbolized by S2, saturates reactor 50 in the reverse direction for the predetermined time $t$, and induces a reverse secondary current, symbolized by 12, to generate a voltage across the contemplated load. The generated voltage is still of an amplitude of 80 volts because of the existing turns ratio, but is now subtractive with relation to the 104 volt reference level being used. The resultant output voltage level at this time is 24 volts.

When control 16 returns to its quiescent state after time $t$, the output at 17 goes negative, and the forward bias for transistors T3 and T4 is removed and these transistors no longer conduct. The output voltage level returns to the 104 volt reference for induction within reactor 50 no longer takes place.

FIGURE 2 is illustrative of the wave forms operative for the embodiment of FIGURE 1. Monostable control time is shown as $t$, the triggering pulse is shown as the INPUT, wave forms A and B depict control outputs at 13 and 17, and the resultant bipolar wave form for the single input is shown as varying between 24 volts and 184 volts.

The operation of the monostable control of FIGURE 5 is that of the basic monostable multivibrator. In its quiescent state, the B+ source provides the necessary collector bias voltages for NPN transistors T6 and T7, and with the B— source, through resistor divider network 66 and 72, the forward bias for the base of transistor T6. Transistor T6 is in saturation during this period, with the negative potential at the collector of transistor T6 effectively at ground. Transistor T7 is maintained at cutoff through resistor 76. The potential at the collector of transistor T7 is equal to the B+ source. Capacitors 78 and 80 provide the rapid application of the regenerative signal from the collector of transistor T7 to the base of transistor T6 through diode 68, being charged to the B+ source through resistor 74. Capacitor 80 is made adjustable to adjust the time of the monostable control.

In operation, a negative impulse is impressed across input capacitor 62 and through diode 64 to the base of transistor T6, to start cutoff of the conduction in transistor T6. Cutting off conduction in transistor T6 permits the collector of transistor T6 to go positive, and thus forward bias the base of transistor T7, through resistor 76, to start transistor T7 into conduction. The high positive voltage at the collector of transistor T7 falls, becoming negative, and being coupled to the base of transistor T6 through diode 68, tends to hold the base of transistor T6 reverse biased. The cross-coupling of the bases and collectors of transistors T6 and T7 permits regeneration resulting in a rapid change in both transistors, driving transistor T7 into saturation and transistor T6 into cutoff.

Capacitors 78 and 80 discharge through resistor 72 and the low saturation resistance of transistor T7 after time $t$. The base potential of transistor T6 becomes less negative, and when the forward biasing potential is reached, transistor T6 again conducts. The collector potential of transistor T6 decreases, and being coupled back to the base of transistor T7 through resistor 76, drives transistor T7 to cutoff. As a result transistor T6 goes into saturation, and transistor T7 is cutoff. This quiescent condition is maintained until another pulse triggers the circuit.

Second embodiment description

FIGURE 3 illustrates the alternate embodiment of the present invention, with the individual components comparable to those of the first embodiment illustrated in FIGURE 1 being identified by the same number. A single monostable control 12 is used, with outputs 13 and 14 as illustrated by FIGURE 5.

Output 13 of control 12 is connected to the base 130 of NPN transistor T11 through capacitor 121. However base bias resistor 120 is connected from base 130 to the emitter of transistor T11. Output 14 is connected to base 134 of NPN transistor T13 through base bias resistor 124. In the embodiment of FIGURE 3, reactor 150 utilizes a control winding 159 center tapped to ground with winding ends 160 and 161. Control winding ends 160 and 161 are connected to bases 132 and 136 of NPN transistors T12 and T14 through biasing resistors 122 and 126, respectively. The emitters of transistors T11, T12, T13 and T14 are all connected to ground. The collectors 131 and 133 of transistors T11 and T12 are connected to winding end 153 of primary winding 152, and the collector 137 of transistor T14 is connected to winding end 155 of primary winding 152. The collector 135 of transistor T13 is connected to winding end 160 of control winding 159. The B+ source is wired directly to center tap 154 and blocking resistor 128 is wired across winding ends 153 and 155 of primary winding 152. The 104 volt reference level is shown impressed upon winding end 157 of secondary winding 156, illustrating that either secondary winding end, 157 or 158, may be connected to the 104 volt reference level, depending on the polarity established by the reactor 150 windings.

Operation of the second embodiment

In operation, the circuit of FIGURE 3 produces the same bipolar wave form as the circuit illustrated by FIGURE 1. A negative input triggers monostable control 12, as before, but a positive output at 13 and a negative output at 14 are now both used. The positive output at 13 is impressed upon base 130, through capacitor 121, forward biasing transistor T11 into conduction. Transistor T13 is normally conducting, but with the output at 14 going negative upon initiation of control 12, the negative output at 14, through resistor 124 removes the forward bias at base 134, cutting off conduction in transistor T13, and removes the ground clamp at collector 135 of transistor T13 and at point *b* of the control winding 159.

Conduction from the B+ source to ground through transistor T12 and primary winding 152 from center tap 154 to winding end 153 is permitted because of base 132 of transistor T12 being forward biased through resistor 122 upon removal of the ground clamp at *b*, and the collector 133 of transistor T12 going minus at point *a* because of the conduction in transistor T11. This current, depicted by S1, induces a current in secondary winding 156 (depicted by I1) and currents through control winding 159 indicated by S3 and S4, the polarity dots indicate minus for this initial energization. The current induced in secondary winding 156 results in an additive 80 volt pulse, because of the existing turns ratio and winding polarities, on the reference level of 104 volts, giving a voltage level of 184 volts at secondary winding end 158.

As the reactor 150 is driven to saturation, base 136 of transistor T14 becomes forward biased through resistor 126 by the positive induced current illustrated by S3, and the forward bias at base 132 of transistor T12 through resistor 122 is removed as a result of the negative induced current illustrated by S4. Conduction is thus cutoff in transistor T12, but is permitted in transistor T14 because of the forward bias at base 136 and the negative condition at the collector 137 of transistor T14 through resistor 128. Conduction for this part of the cycle takes place from the B+ source to ground through primary winding 152 from center tap 154 to winding end 155 and then through transistor T14, now in conduction. This current is illustrated by S2. As a result, secondary winding current, indicated by I2, develops a subtractive 80 volt pulse, because of the existing turns ratio and winding polarities, on the 104 volt reference level, giving a 24 volt level at secondary winding end 158.

When the control 12 returns to its quiescent state after time *t*, point *b* is again clamped to ground because transistor T13 is forward biased into conduction by output 14 going positive, clamping point *b* to ground, removes the forward bias on base 136 of transistor T14 and cuts off conduction in T14. The output at 13 of control 12, going negative, removes the forward bias to base 130 of transistor T11, cutting off conduction through T11, and permits point *a* to go positive again. The circuit is thus returned to its quiescent state, with conduction through reactor 150 stopped and the reference level returned to the 104 volt level.

Figure 4:
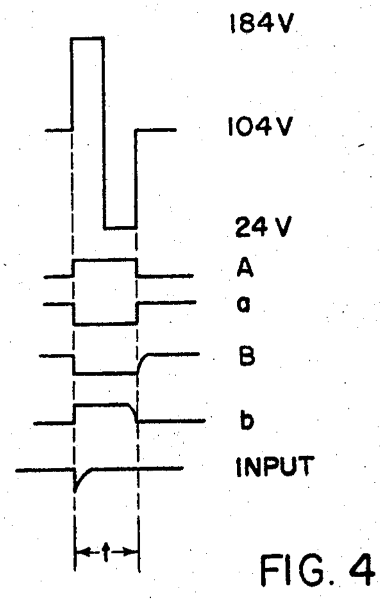
FIGURE 4 is a graph of the wave forms illustrative of the embodiment of FIGURE 3; and, FIGURE 5 is a schematic diagram of the monostable control circuit used in the oscillator circuit.

FIGURE 4 is illustrative of the bipolar output produced for a single input pulse, for the load adapted to be connected across the reactor secondary winding 156. The monostable control outputs are illustrated by A and B, with the wave forms shown for points *a* and *b* for the predetermined time *t*, of the embodiment of FIGURE 3.

While particular embodiments of the invention have been illustrated and described, it will be obvious to those skilled in the art that various modifications may be made in preferred embodiments of the present invention as disclosed in the drawings.

What is claimed is:

1. A monostable controlled oscillator circuit comprising:

a transformer having a primary winding and a secondary winding, a center tap on said primary winding dividing same into first and second winding portions, said center tap adapted to be connected to a direct current voltage source;

first and second actuatable switching means for, upon actuation, respectively connecting said first and second winding portions across said voltage source so that an induced voltage is obtained in said secondary winding;

said secondary winding having one end serving as an output circuit and a second end adapted to be connected to a reference potential, said primary and secondary windings being so arranged that said induced voltage respectively adds to and subtracts from said reference potential when said first and second winding portions are connected across said voltage source; and, monostable control means for controlling said actuatable switching means in response to a received trigger pulse so that for a single said trigger pulse said output circuit provides a train of two voltage pulses respectively made up of said induced voltage added to and subtracted from said reference potential.

2. A monostable controlled oscillator as set forth in claim 1, wherein said monostable control means includes first and second monostable multivibrator circuit means each having an input for receiving a trigger signal and an output, said first monostable multivibrator circuit means having its output coupled to said first actuatable switching means as well as to the input of said second monostable multivibrator circuit means, and said second monostable multivibrator circuit means having its output coupled to said second actuatable switching means, whereby said first and second actuatable switching means are respectively actuated at different points in time by said first and second monostable multivibrator circuit means.

3. A monostable controlled oscillator circuit comprising:

a transformer having a primary winding and a secondary winding, a center tap on said primary winding dividing same into first and second winding portions, said center tap adapted to be connected to a direct current voltage source;

first and second actuatable switching means for, upon actuation, respectively connecting said first and second winding portions across said voltage source so that an induced voltage is obtained in said secondary winding, said actuatable switching means each having an input and an output circuit means;

said secondary winding having one end serving as an output circuit and a second end adapted to be connected to a reference potential, said primary and secondary windings being so arranged that said induced voltage respectively adds to and subtracts from said reference potential when said first and second winding portions are connected across said voltage source;

monostable control means for controlling said actuatable switching means in response to a received trigger pulse so that for a single said trigger pulse said output circuit provides a train of two voltage pulses respectively made up of said induced voltage added to and subtracted from said reference potential;

said transformer includes a saturable core, and first and second feedback windings being electrically connected to the input circuit means of said first and second actuatable switching means, respectively; and, third and fourth actuatable switching means for, upon actuation, respectively electrically connecting said first winding portion across said voltage source and electrically connecting said first feedback winding to a reference potential.

4. A monostable controlled electronic oscillating circuit comprising:

a transformer having a saturable core with input winding means having a center tap on said input winding dividing same into first and second winding portions, and an output winding means, said center tap being adapted to be connected to a direct current source;

a monostable oscillator control means having an input for receiving an input pulse, and an output for supplying control pulses in response to receipt of a said input pulse; and, blocking circuitry means, coupled to said monostable oscillator control means and a direct current source, having switchable paths for connecting either said first or said second winding portions of said input winding means across a said direct current source for permitting said core to generate voltages in said output winding means of a predetermined polarity in response to core magnetization changes of opposite senses produced by current flow in said input winding means in response to a said input pulse.

5. A monostable controlled electronic oscillating circuit as set forth in claim 4 wherein said blocking circuitry means includes a triggering means having switchable paths for alternately supplying a said direct current source to said first and second winding portions of said input winding means.

6. A monostable controlled electronic oscillating circuit as set forth in claim 5 wherein said blocking circuitry means includes at least two semiconductor means for providing a path of controllable conductivity between said direct current source and said first and second winding portions, respectively, of said input winding means to thereby provide core magnetizations in opposite senses.

7. A triggered electronic oscillating circuit means comprising:

a first and second monostable control means connected in series and each having an input means and an output means, and adapted to have an input pulse applied to said input means of said first control means;

a transformer having a saturable core, a primary winding means having a pair of ends and having a center tap therebetween and which is adapted to be connected to a direct current voltage source, and a secondary winding adapted to be connected to an output;

a pair of transistors each having an input circuit means respectively coupled to said first and second monostable control means and output circuit means respectively coupled to the pair of ends of said primary winding means for providing a pair of paths of controllable conductivity between said pair of ends and said direct current voltage source to thereby produce a current flow in said winding means; and, said circuit means being operative for producing a substantially asymmetrical wave form of a predetermined polarity in said secondary winding in response to core magnetization changes of opposite senses produced by current flow in said input winding means in response to said input pulse.

8. A triggered electronic oscillating circuit as set forth in claim 7 wherein said first control means is connected to a first path of controllable conductivity, and said second control means is connected to a second path of controllable conductivity.

9. A triggered electric oscillating circuit as set forth in claim 8 wherein each said path is comprised of a parallel circuit of said transistors.

10. A monostable controlled oscillator circuit comprising:

a transformer having a primary winding and a secondary winding, a center tap on said primary winding dividing same into first and second winding portions, said center tap adapted to be connected to a direct current voltage source;

first and second actuatable switching means for, upon actuation, respectively connecting said first and second winding portions across a said voltage source so that an induced voltage is obtained in said secondary winding, said actuatable switching means each having an input and an output circuit means;

said secondary winding having one end serving as an output circuit and a second end adapted to be connected to a reference potential, said primary and secondary winding being so arranged that said induced voltage respectively adds to and subtracts from a said reference potential when said first and second winding portions are connected across said voltage source; and, monostable oscillator control circuit means coupled to said input circuit means of said actuatable switching means for actuating said switching means so that said first and second winding portions are connected across a said voltage source in response to a trigger pulse to thereby induce voltages of opposing polarities in said secondary winding.

11. A monostable controlled oscillator circuit as defined in claim 10 wherein said control circuit means includes first and second actuatable circuit means each having input and output circuit means, and each having a first and second condition; said input circuit means of said first actuatable circuit means being adapted to receive a trigger pulse, and upon receipt of a said trigger pulse, said first actuatable circuit means being actuated to said second condition, said input circuit means of said second actuatable circuit means coupled to said output circuit means of said first actuatable circuit means and being responsive to said first actuatable circuit means so that when said first actuatable circuit means is actuated from said first condition to said second condition said second actuatable circuit means is actuated to said second condition;

said first and second actuatable switching means coupled to said output circuit means of said first and second actuatable circuit means, respectively, and being responsive to said first and second actuatable circuit means so that said first and second actuatable switching means are alternately actuated to thereby alternately connect said first and second winding portions across a said voltage source.

12. A monostable controlled oscillator circuit as defined in claim 10 wherein said control circuit means is a control circuit means for alternately actuating said switching means so that said first and second winding portions are alternately connected across a said voltage source to thereby alternately induce voltages of opposing polarities in said secondary winding.

13. A monostable controlled oscillator circuit as defined in claim 11 including third and fourth actuatable switching means, for upon actuation, connecting said center tap to a said direct current voltage; said third and fourth actuatable switching means each having input circuit means and an output circuit means; said input circuit means of said third and fourth actuatable switching means being respectively coupled to the output circuit means of said first and second actuatable circuit means, and said output circuit means of said third and fourth actuatable switching means being coupled to said center tap of said transformer.

14. An oscillator circuit as defined in claim 13 including a fifth actuatable switching means having an input circuit connected to said output circuit means of said third and fourth actuatable switching means, and an output circuit connected to said center tap and adapted to be connected to a said direct current voltage source.

15. An oscillator circuit as defined in claim 10 including a feedback winding means, coupled to said second actuatable switching means, for actuating said second switching means when an induced voltage is developed in said feedback winding means.

16. An oscillator circuit as defined in claim 15 wherein said feedback winding means includes a center tap dividing said feedback winding means into two portions; said center tap being adapted to be connected to a reference potential; said first portion of said feedback winding means being connected to said first actuatable switching means and said second portion of said feedback winding means being coupled to said second actuatable switching means.

17. An oscillator circuit as defined in claim 16 including a third and fourth actuatable switching means each having an input and output circuit means, said input circuit means of said third and fourth actuatable switching means coupled to said control circuit means; said output circuit means of said third and fourth circuit means being coupled to said first winding portions of said primary winding and said feedback winding means respectively.

References Cited

UNITED STATES PATENTS

| | | | |
|---|---|---|---|
| 3,229,121 | 1/1966 | Schmidt | 307—275 |
| 3,299,292 | 1/1967 | Clark | 307—282 |

ROY LAKE, Primary Examiner

SIEGFRIED H. GRIMM, Assistant Examiner

U.S. Cl. X.R.

307—273, 282; 328—65